Patented June 10, 1952

2,600,0

UNITED STATES PATENT OFFICE 2,600,045

HERBICIDAL COMPOSITION AND METHOD OF WEED CONTROL

René Blondeau and Johannes Van Overbeek, Modesto, and Richard R. Whetstone, Orinda, Calif., assignors to Shell Development Company, San Francisco, Calif., a corporation of Delaware No Drawing. Application August 26, 1950,
Serial No. 181,696

6 Claims. (Cl. 71—2.3)

The chemical control of weeds has been investigated by numerous workers during recent years. For the most part, their investigations have been concerned with total weed elimination, such as is required on the banks of irrigation canals and the like. For this and similar situations, chemical agents having a substantially permanent herbicidal effect are preferred, such as pentachlorophenol. More recently, a development in weed control has been considered which is arbitrarily referred to as "pre-emergence weed killing." By this term is meant the elimination of weeds from a planted agricultural area prior to emergence of the desired crop. In this type of weed control, an entirely different set of requirements exist for the agent to be applied to the weeds. In order to prevent damage to the crop when or after it germinates and emerges from the soil, it is necessary that the herbicide perform its weed-killing functions and then be either removed or otherwise converted to a non-phytotoxic material. Pre-emergence weed killing is especially valuable in the large scale cultivation of crops such as sugar beets and vegetables.

At the present time, agents which might be used for pre-emergence weed killing are either partially ineffective, too expensive for industrial applications or have a detrimental residual effect upon the emerging crop. For example, pentachlorophenol may be applied to weeds in a hydrocarbon solvent, following which the hydrocarbon evaporates leaving a solid deposit of pentachlorophenol. Upon emergence of the crop, the presence of the toxic agent weed killer has been found to stunt or even kill the crop and, therefore, cannot be used in many instances or must be used under strictly controlled operating conditions.

The application of hydrocarbon oils containing substantial amounts of aromatic hydrocarbons is one method of controlling weed growth. In order for hydrocarbon weed killers to be effective, they must be applied in amounts in excess of about 50 gallons per acre; and in order to insure a total killing, the aromatic content of the hydrocarbon usually must be over 25%.

It is an object of the present invention to improve methods of crop cultivation. It is another object of the present invention to provide an improved process for weed control. It is a specific object of the present invention to provide a pre-emergence weed-killing composition which deposits no residual toxic substance on or in the soil. It is a further object of the present invention to provide an improved weed-killing composition effective when applied in relatively small amounts. Other objects will become apparent during the following discussion.

Now, in accordance with the present invention, it has been found that the herbicidal effectiveness of aromatic-containing hydrocarbon oils is clearly improved by the addition thereto of a certain class of substituted phenols as more fully defined hereinafter. In the following discussion, wherever the term "phenols" is employed, it will be understood that the class referred to includes especially hydrocarbon-substituted phenols containing at least 14 carbon atoms and bearing at least one hydrocarbon substituent having 8 or 9 carbon atoms.

Still in accordance with the present invention, it has been found that the combination of this class of phenols with aromatic-containing kerosene and/or diesel oil fractions or mixtures thereof, provides a new method of pre-emergence weed killing wherein the composition is applied to the weeds prior to the emergence of a crop. After application to the weeds, the hydrocarbon oil evaporates leaving a deposit of phenols which in the absence of the oil has been found to be relatively non-toxic to the emerging crop.

The phenols useful in the composition and process of the present invention preferably contain from 14 to 20 carbon atoms, since it has been found that phenols of greater or less carbon content are relatively ineffective for the present purposes. An additional criterion which the phenols should possess is a minimum water solubility of 0.0003 g. per 100 g. of water at 20° C. While maximum water solubility does not appear to be limited according to the data available at the present time, this property is more or less limited by a corresponding requirement that the phenols must be soluble in the aromatic oils described hereinafter. The properties of solubility and carbon content as defined above should result in a phenol having a spreading pressure preferably greater than 15 dynes per centimeter. Spreading pressure has been defined by Harkins and Livingston, J. Chem. Phys., 10, 342 (1942).

While the broadest concept of the present invention is the use of phenols having 14 to 20 carbon atoms in conjunction with the aromatic oils, it has been found that the most effective phenols for the present purpose have from 14 to 15 carbon atoms and preferably contain an alkyl radical in a position para to the phenolic hydroxyl.

The phenols contemplated for use in the present compositions and process may bear either saturated or unsaturated hydrocarbon substituents, although preferred substituents include alkyl and cycloalkyl substituents having 8 or 9 carbon atoms. While the hydrocarbyl substituents may be in either the ortho, meta, or para positions, it has been found that phenols bearing a ...tituent are particularly effective, especially when said substituent is an alkyl radical. Moreover, it has been noted that branched alkyl radicals tend to impart greater effectiveness to these herbicidal compositions.

It has been found that the use of these phenols in an aromatic mineral oil, such as defined hereinafter, produces a herbicidal composition having the required dual characteristics of high herbicidal activity while the composition remains intact and relatively no phytocidal activity on plants after their emergence and after the oil has evaporated. In the relatively small amounts required these phenols are substantially harmless to all forms of established plant life in the absence of hydrocarbon oil but have been found to improve the herbicidal character of aromatic containing oils to a remarkable degree.

The following list of specific phenols illustrates the scope of the invention in its most preferred aspects. It will be understood that the species hereinafter enumerated are merely typical of the classes which may be employed and in view thereof, they should be only considered as limiting the scope of the invention within the general requirements and limitations set forth hereinbefore.

The following monoalkyl phenols are the preferred class of phenols for use in these compositions. More especially, as outlined above, para-monoalkyl phenols are preferred, particularly when the alkyl group has a branched configuration.

*Mono-alkyl phenols* n-Octyl phenols
Isooctyl phenols
3,5-dimethylhexyl phenols
2,2,4-trimethylamyl phenols
Nonyl phenol mixtures derived by alkylating phenol with propylene trimers The mixed alkylphenols may be derived by alkylation of phenol with lower olefin polymers such as propylene polymers to form monohydroxyphenyl-substituted alkanes. The monohydroxyphenyl-substituted alkanes here contemplated preferably should have from 6 to 12 carbon atoms in the alkane chain. As respects chain structure, the alkane skeleton should be substantially that of acyclic propylene polymers. The following is a typical structure, where $m$ in an integer from 0 to 2:

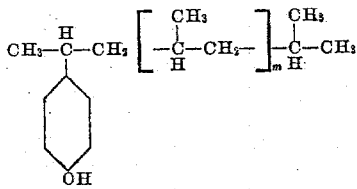

Dialkyl phenols are also suitable for use in the subject compositions. Preferably, these are 2,4-dialkyl or 2,6-dialkyl phenols and especially those species bearing at least one branched alkyl radical in either the 2, 4 or 6 positions. Examples of such dialkyl phenols are 2-tert-butyl-4-n-octyl phenol and 2-n-octyl-4-methyl phenol.

Trialkyl phenols may be employed in the aromatic oils described hereinafter. The preferred configuration of this type of phenol includes trialkyl phenols having at least one branched alkyl substituent, said substituent being in either the 2 or 6 position.

Examples of such trialkyl phenols are 2,4-diethyl-6-isooctyl phenol, 2,6-dimethyl-4-(3,3,4-trimethylamyl) phenol, and 2,4-dimethyl-6-(3,5-dimethylheptyl) phenol.

While tetraalkyl phenols are not as effective as other types of alkylated phenols they may be used if one of the alkyl substituents has 8 carbon atoms.

An example thereof is 2,3,6-trimethyl-5-(3,5-dimethylhexyl) phenol.

While the aliphatic substituted phenols have been found to have the greatest effectiveness for use in the present compositions, cycloalkyl phenols may be used. Examples of such cycloalkyl phenols are 2-ethylcyclohexyl phenols and 2,5-dimethylcyclohexyl phenols.

The oils to be used in the present herbicidal compositions should contain at least 10% by weight of aromatic hydrocarbons expressed as 100% minus the percent of "unsulfonatable residues." Preferably, the aromatic content is between 10% and 40% by weight, and optimum results are obtained if the oil contains between 10% and 25% aromatics.

The boiling range of the aromatic oil will depend upon the specific application conditions, such as temperature and rate at which the oil must evaporate. Under most agricultural conditions, it will be found that oils boiling in the kerosene and diesel oil range will be satisfactory; hence, initial boiling points of above about 275° F. and final boiling points of below about 550° F. or slightly higher are required. A preferred oil is one having a boiling range of less than about 100° F., preferably having an initial boiling point of 300° F. and a final boiling point of 400° F. Optimum results are obtained when the oil boils between about 315° and 390° F. Oils falling within these requirements generally have a viscosity of less than 30 and preferably between 10 and 25 seconds Saybolt Universal at 100° F. A typical aromatic oil useful where normal agricultural temperatures are encountered has the following properties:

| | | |
|---|---|---|
| IBP | °F | 320 |
| FBP | °F | 384 |
| $n_D^{20}$ | | 1.4490 |
| Density at 20° C. | | 0.8054 |
| Aromatics | per cent | 12.6 |
| Naphthenics | do | 38.0 |
| Olefins | do | 0.0 |
| Paraffins | do | 49.4 |
| Carbon | do | 86.64 |
| Hydrogen | do | 13.49 |
| Sulfur | do | 0.01 |
| Nitrogen | do | 0.06 |

The compositions comprising the phenols and aromatic oil contain a substantial amount of the phenol in the most concentrated form of the invention, and in the most dilute effective compositions about 0.25% by weight of the phenol is present. It will be realized that compositions of this character will be marketed as concentrates containing from 10% to 60% by weight of the phenol and preferably between 40% and 55% by weight of the phenol. When used for field application, however, such concentrates should be diluted with additional amounts of the aromatic oil to give compositions having at least 0.25% phenol and preferably 0.5% phenol minimum. The effective field application, depending upon the exact condition encountered, may require concentrations up to 5% by weight of the phenol, and optimum concentrations are between 1% and 2.5% of the phenol.

While the compositions may be sprayed in the form of the unmodified solution, further alternative means of application comprise application to weeds in the form of an emulsion. The phenols comprising the essential improving agent in this invention act as temporary emulsifying agents so that in many instances the use of additional emulsifiers or emulsion stabilizers is unnecessary. However, if more stable emulsions are required, any of the well-known emulsifying agents may be employed. Typical of these are sorbitan monolaurate, sorbitan monooleate, sodium alkyl aryl sulfonate, sodium aryl sulfonate, free alkylated kerosene sulfonic acids, quaternary ammonium compounds and higher molecular weight amines, such as octadecylamine and heptadecenyl hydroxyethyl glyoxalidine.

While the compositions, as defined hereinbefore, provide maximum weed control, other agents may be added to the compositions to extend their effectiveness or to synergize therewith. These include agents such as sodium trichloroacetate, isopropylphenyl carbamate and maleic hydrazide.

The process of the present invention comprises the steps of spraying an area which has been planted with crop seeds but from which weed plants have already emerged with the acid and aromatic hydrocarbon compositions defined above. The spraying is conducted at such time and under such conditions that the hydrocarbon oil evaporates to a large extent before the crop germinates and emerges from the ground or at least before stomata development in the emerging crop leaves.

Preferably, application of the compositions defined should be made on hot, humid days and in full sunlight. The latter preferred conditions are those under which the stomata are dilated to the maximum extent. The worst type of conditions would comprise application on cold, dry overcast days or during the late afternoon or evening. If the penetrating agents were not present, the weed kill is relatively low. However, when the compositions of this invention are employed, highly effective kill is accomplished even under these adverse conditions.

Dependent upon the agent and size of the weeds and other conditions, the above compositions should be applied in amounts ranging from about 15 to 50 gallons per acre, while effective weed control is generally gained by the use of 20–35 gallons per acre. It will be realized that smaller amounts of the compositions may be used if aqueous emulsions are employed but that in such a case, increased amounts of a phenol may be required. Preferably, application of the composition is made to the weeds when they are small, since large weed plants require a correspondingly greater amount of herbicidal compositions for effective coverage. The following example illustrates the effectiveness of the present compositions.

*Example*

A kerosene having about 10% aromatic content was sprayed on plants to determine its phytocidal activity. It was found that while the oil injured the leaves to a limited extent, no major toxic effect was exhibited. When the phenols listed below were dissolved in the same oil and applied to plants as a vapor spray in concentrations similar to those used in field application, highly toxic and lethal results were obtained. The following table illustrates the results obtained in these experiments.

| Phenol | Minimum toxic Concentration in percent |
|---|---|
| para-tert-butyl phenol | 1 |
| 3,3-dimethyl-3 (para-hydroxyphenyl)propane | 1 |
| 2,2,4,4-tetramethyl-4(para-hydroxy-phenyl)butane | 0.5 |
| mixed para-nonyl phenols | 0.5 |
| mixed para-dodecyl phenols | 2 |
| 3,3-dimethyl-3 (ortho-hydroxyphenyl) propane | 1 |
| 2,4-dimethyl-6-tert-butyl phenol | 2 |
| para-cyclohexyl phenol | 2 |
| rtho-phenyl phenol | 1 |
| para-phenyl phenol | 1 |

The invention claimed is:

1. A herbicidal composition comprising a major amount of a hydrocarbon oil boiling between 300 and 400° F. and having at least a 10% aromatic content and having a minor amount of 2,2,4,4-tetramethyl-4(para-hydroxyphenyl)butane.

2. A herbicidal composition comprising a major amount of a hydrocarbon oil boiling between 300 and 400° F. and having at least a 10% aromatic content and having a minor amount of mixed para-nonyl phenols.

3. A composition of matter comprising a major amount of a hydrocarbon oil having at least a 10% aromatic content, said oil boiling within the range from about 275° F. to about 550° F., and a minor amount of a hydrocarbon substituted phenol in which the hydrocarbon substituent has from 8 to 9 carbon atoms.

4. A composition of matter comprising a major amount of a hydrocarbon oil having at least a 10% aromatic content, said oil boiling within the range from about 275° F. to about 550° F., and a minor amount of an alkylated phenol having a para-alkyl substitutent of from 8 to 9 carbon atoms.

5. A composition of matter comprising a hydrocarbon oil having at least a 10% aromatic content, said oil boiling within the range from about 270° F. to about 550° F., and an amount sufficient to improve the herbicidal properties of said composition of an octyl phenol.

6. In a process for killing weeds wherein the weeds to be killed have emerged from the soil prior to emergence of a crop, the steps which comprise applying to said weeds a composition comprising a major amount of a hydrocarbon oil boiling between 275 and 500° F. having at least a 10% aromatic content and a minor amount sufficient to improve the herbicidal properties of said composition of a hydrocarbon substituted phenol in which the hydrocarbon substituent has from 8 to 9 carbon atoms.

RENÉ BLONDEAU.
JOHANNES VAN OVERBEEK.
RICHARD R. WHETSTONE.

REFERENCES CITED

The following references are of record in the file of this patent:

UNITED STATES PATENTS

| Number | Name | Date |
|---|---|---|
| 2,160,929 | Warner et al. | June 6, 1939 |
| 2,392,859 | Meuli | Jan. 15, 1946 |

FOREIGN PATENTS

| Number | Country | Date |
|---|---|---|
| 7927/32/ | Australia | Dec. 8, 1932 |

OTHER REFERENCES

Botanical Gazette, June 1946, pages 475 to 507 (pages 496 & 497 particularly relied upon).